Dec. 17, 1963  O. RONNER ETAL  3,114,295
COPYING MACHINE TOOL
Filed Dec. 27, 1961  10 Sheets-Sheet 1

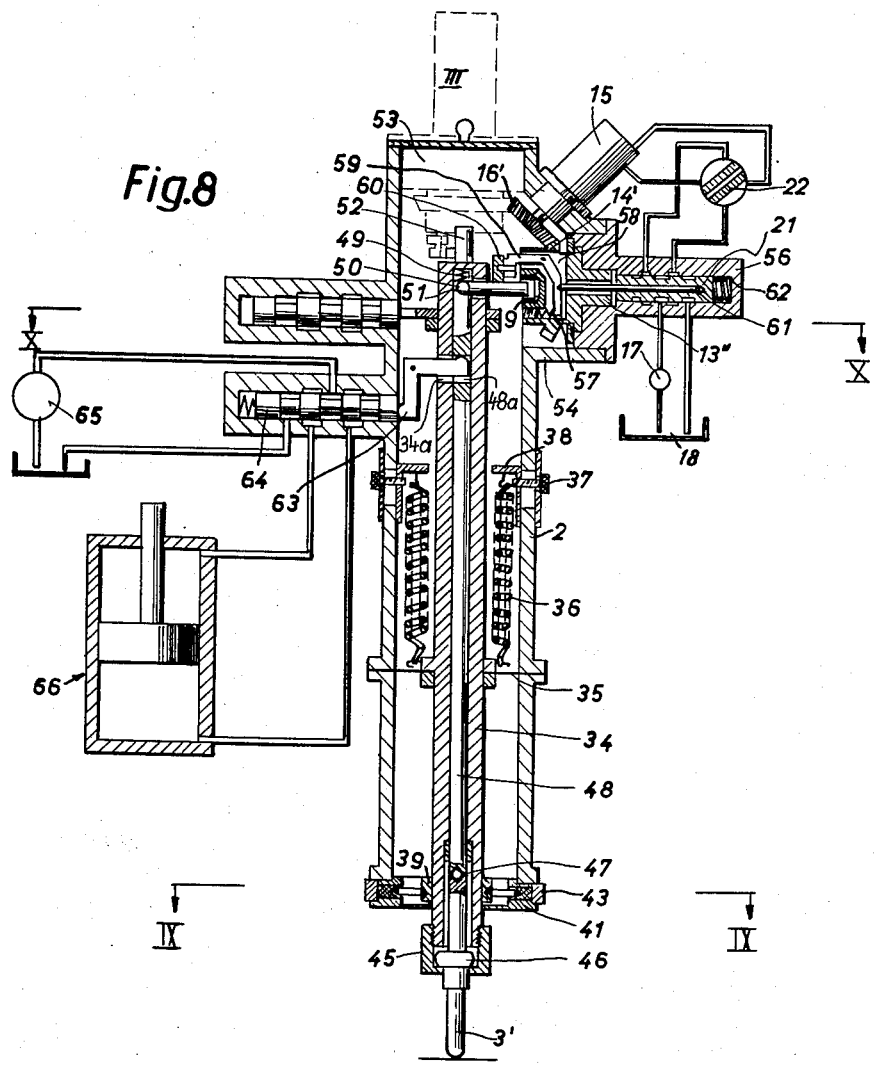
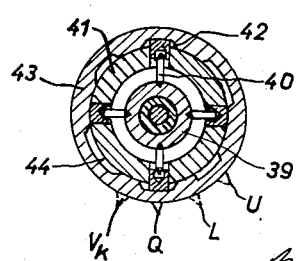

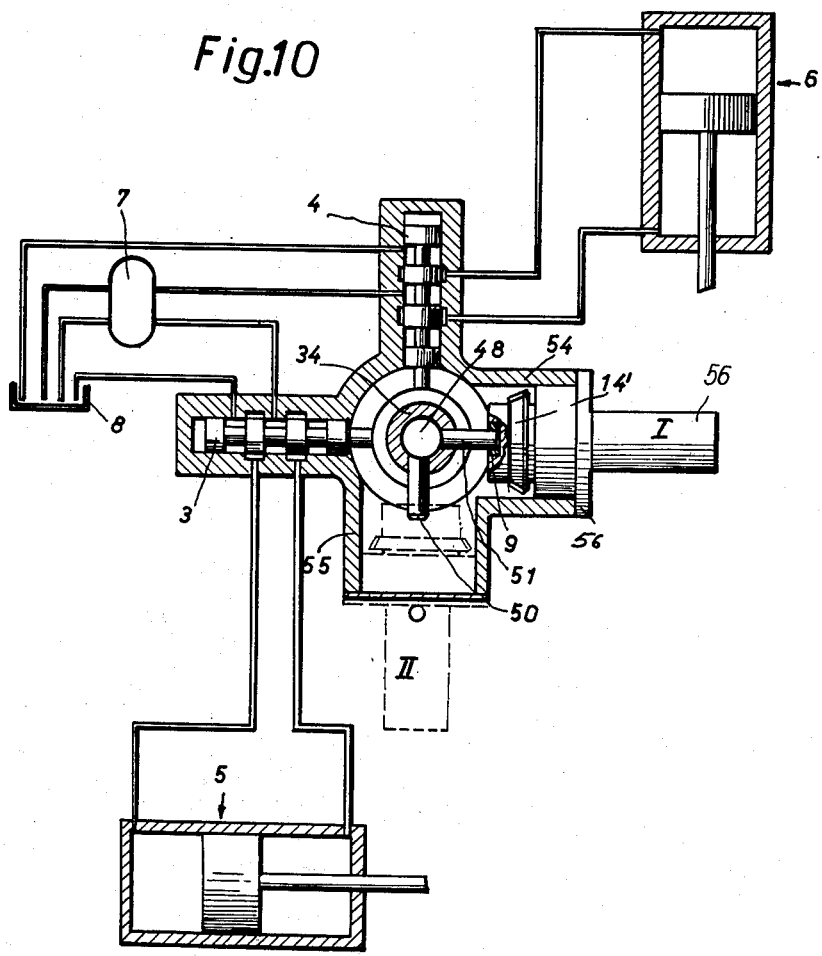

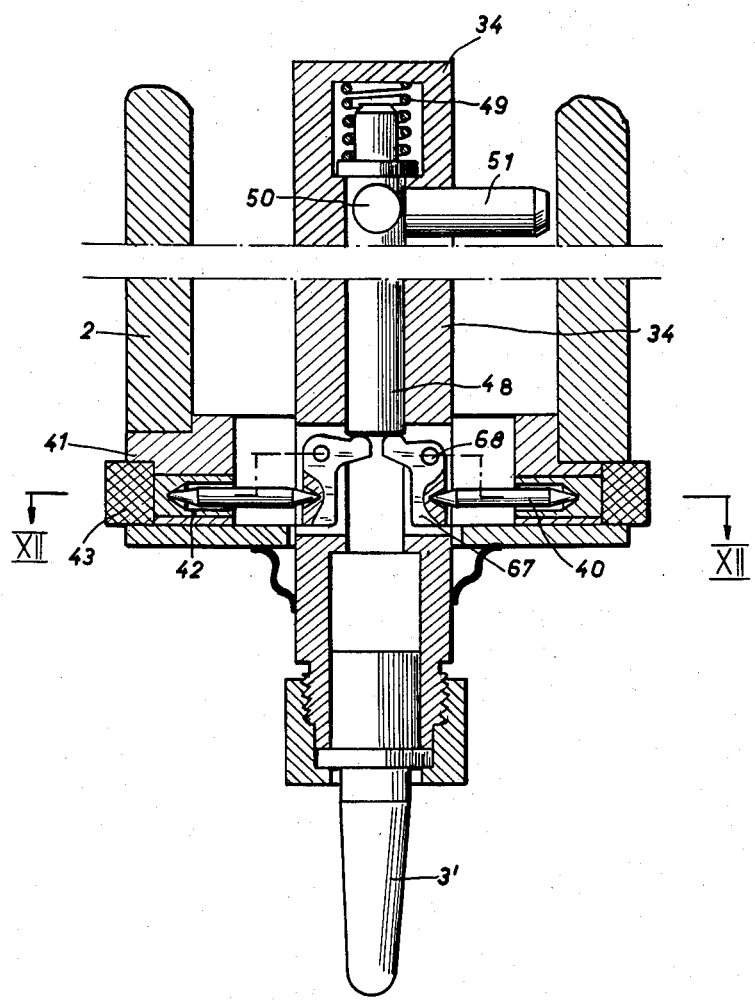

Dec. 17, 1963 O. RONNER ETAL 3,114,295
COPYING MACHINE TOOL
Filed Dec. 27, 1961 10 Sheets-Sheet 9

Dec. 17, 1963

O. RONNER ETAL 3,114,295

COPYING MACHINE TOOL

Filed Dec. 27, 1961

10 Sheets-Sheet 10

Karl Aebi and
Otto Ronner,
Inventors
By Wenderoth, Lind
& Ponack, Attorneys

United States Patent Office 3,114,295
Patented Dec. 17, 1963

3,114,295
COPYING MACHINE TOOL
Otto Ronner and Karl Aebi, Rorschacherberg, Switzerland, assignors to Starrfrasmaschinen A.G., Rorschacherberg, Switzerland
Filed Dec. 27, 1961, Ser. No. 162,483
Claims priority, application Switzerland Dec. 28, 1960
9 Claims. (Cl. 90—62)

The present invention relates to an automatic feeler device on a contour copying machine tool having a feeler, movable in any direction within an abutment ring and urged against the pattern and the abutment ring by the action of a pre-controlling force, whereby the direction of this force and thus the direction of feed is determined by a pre-controlling unit automatically adjusting itself around the axis of the ring in dependence of the direction of the tangent at the point of contact between the pattern and the feeler.

In an automatic feeler device of this type the abutment ring and the feeler form the coacting contacts of an electric switch directing the pre-control unit. In this arrangement the pre-control unit continuously oscillates around a middle position, whereby the direction of the pre-controlling force continuously changes, the pre-control unit is unnecessarily stressed and the contacting surfaces will soon be damaged by burning effects due to the constant switching.

It is an object of the invention to provide an improved automatic feeler device by means of which two and three dimensional patterns can be copied without having to tolerate the disadvantages mentioned above. For this purpose an automatic pre-control apparatus according to the invention comprises a rotatable pre-control unit adapted to rotate from a position of rest in one or the other direction in response to the movements of a pre-control member turning with said unit, said pre-control member being moved from a neutral position in one or the opposite direction according to the deflecting movements of the feeler following the contour of the pattern.

Figure 1:
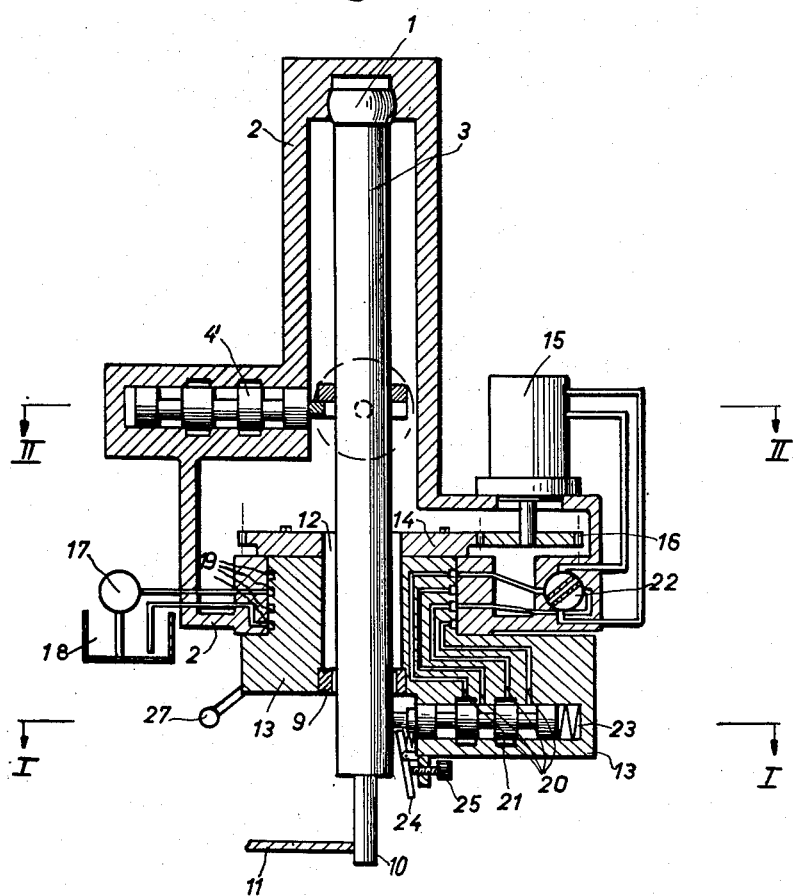
Figure 2:
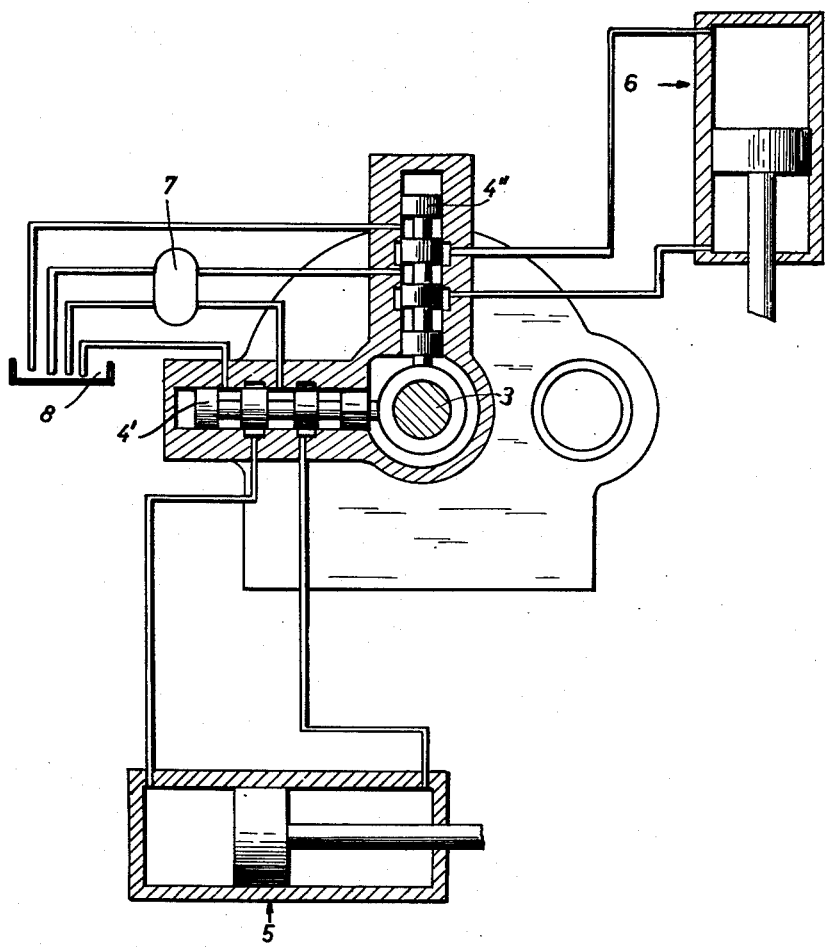
Figure 4:
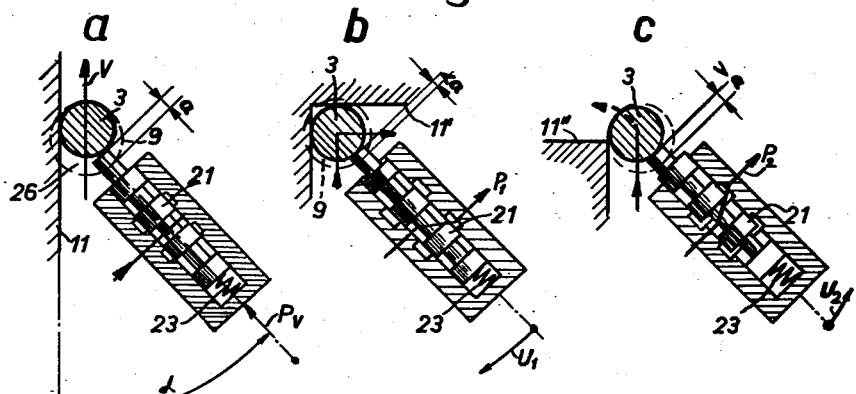
Figure 5:
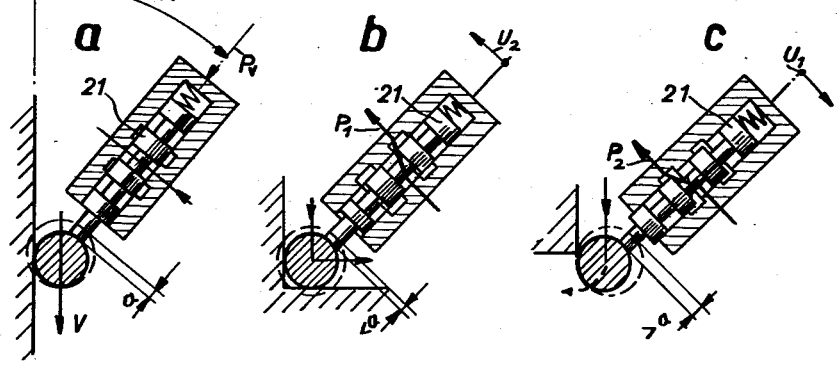
Figure 3:
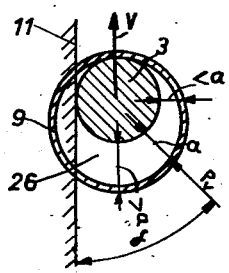
Figure 7:
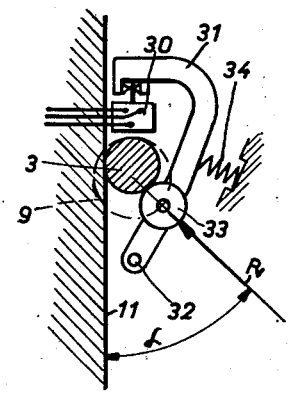
Figure 6:
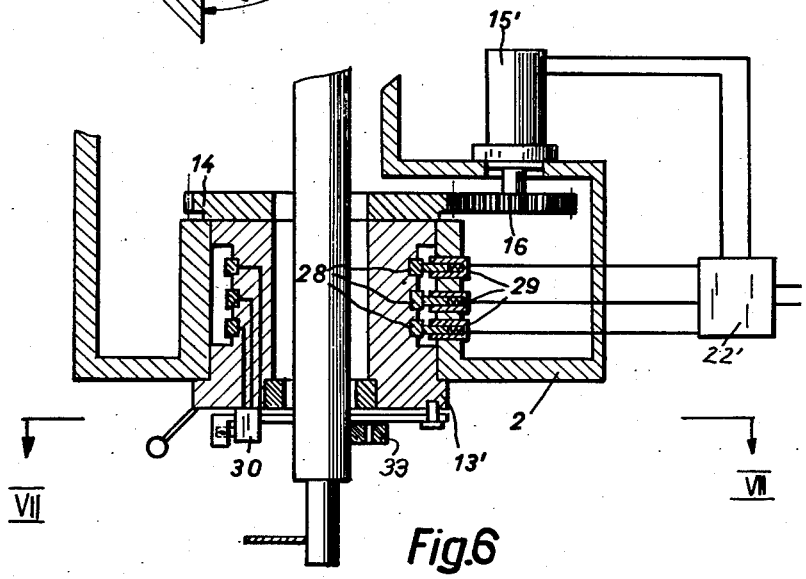
Figure 12:
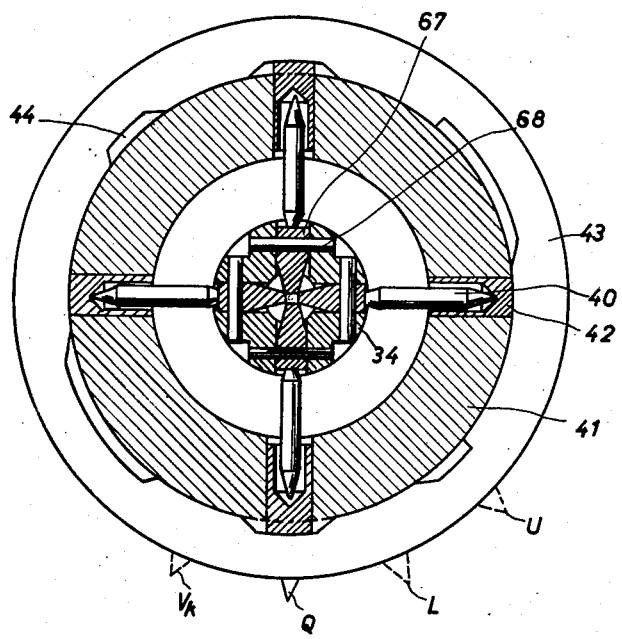
Figure 13:
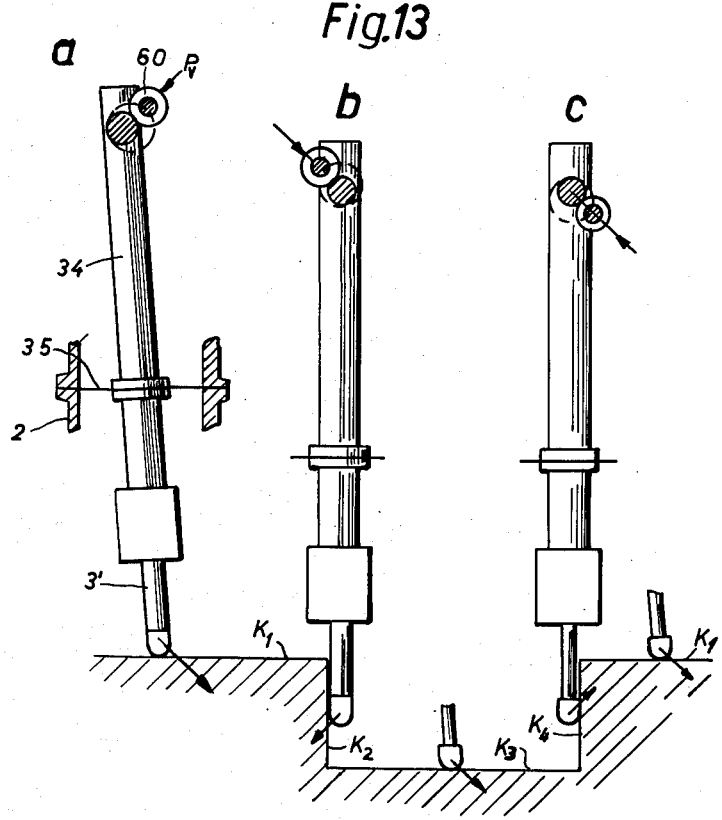
Figure 14:
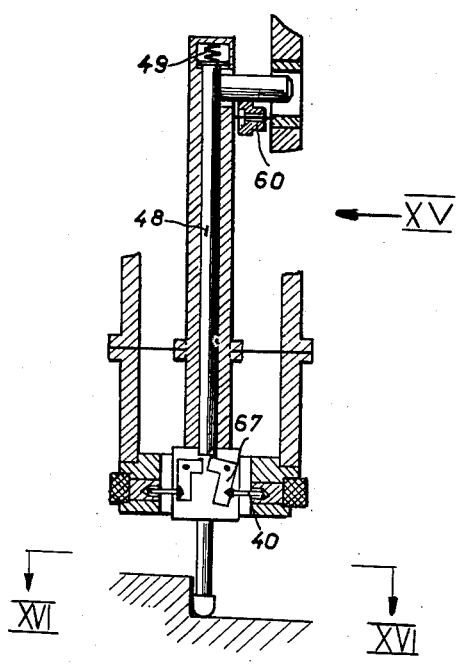
Figure 15:
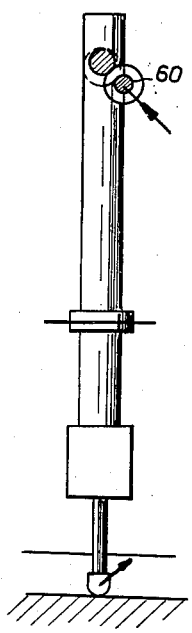
Figure 16:

The present invention will now be described in more detail with reference to the accompanying drawings, in which:

FIGURE 1 is a vertical section through a feeler head according to a first embodiment of the invention, FIGURE 2 is a cross-section on the line II—II of FIGURE 1, FIGURE 3 is a sectional view of the abutment ring and the feeler, FIGURES 4a–c and FIGURES 5a–c, respectively, show the feeler operation in opposite directions of feed with the contours of the pattern extending parallel, projecting or receding with respect to the direction of feed, FIGURE 6 represents a portion of the feeler head according to FIGURE 1, the hydraulic pre-control unit, however, being replaced by an electric unit, FIGURE 7 is a section on the line VII—VII of FIGURE 6, FIGURE 8 is a further example of construction for three dimensional line-copying, FIGURE 9 is a cross-section on the line IX—IX of FIGURE 8, FIGURE 10 is a cross-section on the line X—X of FIGURE 8, FIGURE 11 shows the modified lower portion of a construction of the feeler device according to FIGURE 8, FIGURE 12 is a cross-section on the line XII—XII of FIGURE 11, FIGURES 13a–c indicate various feeler positions in copying three-dimensional forms with the feeler device according to FIGURE 8 or 11, FIGURE 14 is a vertical section through the feeler device according to FIGURE 11 when said feeler moves against a wall forming an acute angle relatively to the direction of feed, FIGURE 15 is a view taken in the direction of the line XV—XV of FIGURE 14, and FIGURE 16 is a section on the line XVI—XVI of FIGURE 14.

In the example of construction shown in FIGURES 1 and 2 a feeler 3 which is pivotally suspended in a housing 2 by means of a ball joint 1, is in operative connection in a manner known per se with control pistons 4' and 4" which are accommodated in the housing 2 and which in turn control the feeding cylinders 5 and 6 for longitudinal and transverse feed. The arrangement is made so that the control pistons 4 and 4" prevent the flow of the pressure fluid which is supplied from a pool 8 by a pump 7, to the associate feeding cylinders when the feeler 3 assumes a middle position relatively to an abutment ring 9 surrounding the lower portion of the feeler. Accordingly in deflecting the feeler a feeding action is effected corresponding to the direction of deflection.

The abutment ring 9 is inserted in a bore 12 of a rotary head 13 which is mounted for rotation in the bottom portion of the housing 2. At its upper end face the rotary head 13 is provided with a gear wheel 14 which meshes with a pinion 16 which is splined to the shaft of an oil driven motor 15. Pressure oil fed from a container 18 by a precontrol pump 17 is supplied to the oil driven motor 15 over annular grooves 19 and ducts 20 of the rotary head 13 according to the position of a pre-control piston 21 accommodated in the latter. A four-way valve 22 for changing the direction of rotation or flow is arranged in the flow path of the pressure oil to the motor 15. By the action of a spring 23 the pre-control piston 21 is urged against the feeler 3 and the latter is forced against the pattern 11 or the abutment ring 9, as will be seen particularly from FIGURES 3 to 5. The pre-control piston 21 has a neutral position in which the supply of pressure oil to the motor 15 is shut off. From its neutral position the piston 21 can be moved in one or the other direction by the movement of the feeler, whereby the oil driven motor 15 is also driven in one or the other direction. By means of a bolt lever 24 and a set screw 25 the pre-control piston 21 can be permanently removed from contact with the feeler 3 against the action of the spring 23, in order to be able to easily move the feeler by hand.

In operation, the feeler 3 is urged against the pattern 11 by the action of the pre-control force exerted by the spring 23, and at the same time against the abutment ring 9, as shown in FIGURE 3. The arrangement is then made so that the piston 21, movable in the direction of the pre-control force Pv, assumes a neutral position when the angle formed between the pre-control force Pv and the tangent at the contacting point between the pattern and the feeler, amounts to a predetermined value α, a feed motion extending parallel to the contacting tangent as indicated by the arrow V being initiated. Between the feeler 3 and the abutment ring 9 a gap 26 of approximately comma shape is formed which has the width a, measured in the direction of the advance control force Pv. It will be understood that the pre-control member 21 actually feels the width in the direction of the pre-control force, of the gap 26, said pre-control member assuming its neutral position when the width corresponds just to the value a. Such a position of the pre-control piston is illustrated in FIGURE 4a, according to which the feeler 3 urged against the abutment ring 9 and against the pattern 11 slides in the direction V along the contour of the pattern, which in this case coincides with the tangent of contact.

When the feeler 3 strikes against a contour section projecting relatively to the direction of feed, such as indicated for example at 11' in FIGURE 4b, the feeler is urged back by the abutment ring 9, whereby the component of the feeler motion situated in the direction of the pre-control force Pv causes a movement of the pre-control piston 21 from the neutral position against the action of the spring 23. In the direction of the arrow $P_1$ the flow of the pressure oil from the pump 17 to the oil driven motor 15 is then released, which motor in turn causes a rotation of the rotary head 13 in the direction of rotation $U_1$. The control piston 21 turning with the head 13, the pre-control force Pv also turns in the same direction until a pre-control angle α with respect to the contour 11', will be obtained. The feeler 3 and the piston 21 then assume the same position with respect to the contour 11' as shown in FIGURE 4a with respect to the contour 11, whereby the width of the gap 26 measured in the direction of the pre-control force is increased again to the value a and the piston 21 accordingly stops any further supply of pressure oil to the motor 15.

Vice versa, the pre-control member according to FIGURE 4c opens the flow of the pressure oil in the direction of the arrow P2, when the feeler 3, starting from the position according to FIGURE 4a, must follow the shape of a receding contour 11''. The control motion of the pre-control member 21 is also in this case dependent on the component of the feeler movement, which coincides with the direction of the pre-control force, but it is effected not against but by the action of the spring 23, since the correspondingly measured width of the gap 26 is increased beyond the amount a. The rotation of the rotary head 13 takes now place in opposite direction, i.e. in the direction of rotation $U_2$ until the concurrently rotating control piston 21 and thus the direction of the pre-control force have the required angular position with respect to the contacting tangent, in the present case to the contour 11''.

The above description of operation also applies to FIGURES 5a to c with the difference that the pressure oil flow in the direction of the arrow $P_1$ causes a rotation of the rotary head 13 in the direction of rotation $U_2$ while the flow in the direction of the arrow $P_2$ effects a rotation as indicated by the arrow $U_1$. In order to obtain these results, the change-over switch or valve 22 has to be reversed. In both cases, after the feeler has been applied by hand onto the pattern, the feeler is made to follow the contour of the pattern, if necessary all around, which is thereby copied, and the pre-control force is automatically adjusted by the rotation of the rotary head 13 and is always effective at the angle α. In this manner, the direction of feed is adjusted according to the scanned contour and a constant feed is thus obtained.

The valve 22 for changing the direction of rotation, in the two positions of which the scanning movement along the pattern is initiated in one or the other direction, has a middle position, in which inlet and outlet of the oil driven motor 15 is shortcircuited and also any pressure oil inflow to the motor 15 and thus the control thereof by the pre-control member is interrupted. By means of a hand lever 27 provided on the rotary head 13 the direction of the pre-control force can be adjusted by turning the rotary head 13 by hand, whereby the shape of the pattern can be scanned all around by the action of manual control. The feeler 3, moreover, can be guided as desired by hand with little effort, when the pre-control member 21 is moved by means of the bolt lever 24 and the set screw 25 against the action of the spring 23 into an ineffective position.

As illustrated in FIGURES 6 and 7, the pre-control may also be effected by electrical means, for example in order to be able to operate with a minimum feeler pressure. The rotary head indicated in FIGURE 6 by the numeral 13' is again controlled by means of the gear wheel 14 and the pinion 16 which is keyed to the shaft of an electromotor 15'. The control of the motor 15' in both directions of rotation is effected by slip rings 28 secured to the rotary head 13', or by brushes 29 fastened in the housing 2 by the intermediary of a change-over switch 30 which is mounted on the lower end face of the rotary head 13'. As is evident from FIGURE 7, the switch 30 which is a precision switch, is actuated by means of a lever 31 which is pivotally mounted on the rotary head at 32 and provided with a roll 33 urged against the feeler 3 by the action of a spring 34 engaging the lever 31. Thus, the feeler 3 is urged against the pattern 11 and the abutment ring 9 by the action of the spring 34, while the movements of the feeler are transmitted to the switch 30 by the lever 31. In a manner similar to the hydraulic construction of FIG. 1, the arrangement is made so that the switch 30 interrupts the current supply to the driving motor 15', when the precontrol force Pv forms an angle α with the tangent at the contacting point of the pattern and the feeler, while in deflecting the lever from this position in one or the other direction the driving motor 15' is put in operation. Also in this case a switch 22' for changing the direction of rotation is provided, by means of which the direction of scanning around the model can be determined. The operation of the device described corresponds in all details to that of the first described embodiment of the invention, the statements made in that connection being accordingly valid for the present example.

The form of construction of the feeler device according to FIGURES 8 to 10 permits the feeler to follow the shape of a pattern in all three dimensions of space. In contradistinction to the examples previously described, a feeler unit with a feeler tube 34 is provided, which tube is mounted intermediate its length in the housing 2 by means of a diaphragm so as to be capable of oscillating in all directions and moving in axial direction. The weight of the feeler unit is compensated by means of tension springs 36, one end thereof engaging the feeler tube 34, while the other ends are connected to webs 38 which are axially adjustable on the housing 2 and fixed thereto by means of screws 37.

The bottom end of the feeler tube 34 carries a ring 39 in which are held the inner ends of two pairs of supporting pins 40 arranged crosswise with respect to each other. With their outer ends the supporting pins engage each a sliding piece 42 which is radially movable in a bore of a ring 41 secured to the housing 2 within a set ring 43 which is rotatably carried by the latter. Recesses 44 arranged in pairs and situated diametrically opposite each other are provided on the inner wall of the adjusting ring 43, said recesses being arranged so that by rotating the adjusting ring the radial mobility of both pairs of supporting pins can be interrupted individually or simultaneously. According to FIGURE 9 the supporting pins 40 situated in north-south direction can be radially moved, while the two remaining supporting pins are blocked. Thereby the feeler 3 can oscillate in the north-south-plane, but not in the west-east-plane as seen in FIG. 9. It will be understood that the described arrangement permits to restrict the oscillatory movement of the feeler to the east-west-plane, to allow it to take place in both planes or to stop it altogether. The corresponding movements of the feeler are transmitted to the longitudinal or transverse control piston also in this example of construction. These parts and also the remaining members of the pre-control device are designated by like reference members as already used in FIGURES 1 and 3.

A feeler carrier 46, in which the feeler 3' is held, is mounted at the bottom end of the feeler tube 34, so as to be tiltable in all directions, by means of a cap nut 45. A transmission rod 48 is supported by the intermediary of a ball 47 on the top end of the feeler 3' extending into the feeler tube 34. By the action of a spring 49 supported on the upper end of the transmission rod 48 which is axially movable in the feeler tube 34, the feeler 3', when laterally not loaded, is adjusted so as to extend coaxially with the transmission rod 48. However, from this position the feeler 3' can tilt laterally, as soon as the lateral pressure exerted thereon by the pattern overcomes the power of the spring 49. When the feeler 3' tilts or oscillates the transmission rod 48 is urged upwardly in the feeler tube 34.

At its upper end the transmission rod 48 carries two pre-control bolts 50 and 51 (compare also FIGURE 10) which extend at right angles to the rod and also to each other and pass each through a vertical slot in the feeler tube 34. In this arrangement a rotation of the transmission rod 48 relatively to the feeler tube 34 is prevented, but not the axial movement thereof. A further pre-control bolt 52 extends axially above the feeler tube 34. The three bolts 50, 51 and 52 are positioned with respect to each other in the manner of the axes of a three-dimensional rectangular system of coordinates.

The housing 2 comprises three sockets 53, 54 and 55 (see also FIGURE 10) which are coaxial each with one of the bolts 52, 51 and 50. When operating in the various planes a plug assembly 56 of the pre-control unit is always inserted in one of these sockets, according to the drawing in the socket 54. A rotary head 13" is mounted for rotation in the plug assembly and carries the abutment ring 9 in a bore at the front end. The particular bolt, according to the drawing the bolt 51, engages the abutment ring. A spring 57 in the rotary head 13" acts against one end of a lever 59 which is accommodated in a recess 58 of the rotary head and carries a roll 60 at its free end, which roll urges the bolt 51 against the abutment ring 9. By the intermediary of a push rod 61 the lever 59 is connected to the piston 21 which in turn is under the influence of a spring 62 and is accommodated in the plug assembly 56. Also in this case the arrangement is made so that owing to the movement of the control piston 21 out of its neutral position, the admission of the pressure oil, supplied by the pump 17 to the motor 15 is controlled in order to drive the latter alternately in both directions of rotation, in which case again a switch or valve 22 for changing the direction of rotation will be used. The oil driven motor 15 is mounted in the housing 2 so that the pinion 16' which is in this case of cone shape and keyed to the motor driven shaft, meshes with a bevel gear wheel 14' arranged on the rotary head 13".

The vertical movements of the transmission rod 48 are also transmitted to a piston control valve 64 for the vertical movement, by means of a lever 63 which is mounted in the housing 2 and extends through a slot 34a of the feeler tube 34 into a recess 48a of the transmission rod, the piston 64 controlling the feed cyclinder 66 acting in vertical direction by means of the pressure oil supplied from a pump 65.

When the plug assembly 56 is inserted in the position (FIG. 10) and when the ring 43 is in the adjusted position as illustrated in FIGURE 9, the feeler tube 34 can freely oscillate in the north-south-plane, the feeler 3', however, can freely oscillate in all directions. It shall be assumed, as indicated by the mark Q of the adjusting ring 43 in FIGURE 9, that in this case the machine operates for cross-line-copying.

By the action of the pre-control Pv (also compare FIGURES 13a–b) and the resistance offered by the pattern, the bolt 51 is forced against the abutment ring 9, the feeler point moving along the contour $K_1$ of the pattern in the direction of the cross-line. When arriving at the contour $K_2$, the feeler, together with the feeler tube 34 is angularly moved, whereby the rotation of the rotary head is initiated until the revolving pre-control force Pv has arrived at the normal position corresponding to the contour $K_2$ and the piston 21 thus has assumed its neutral position. The same operation will be repeated, when the feeler arrives at the contours $K_3$ and $K_4$ or at the continuation of the contour $K_1$. When the plug assembly is brought into the position II according to FIGURE 10 and the adjusting ring 43 is set for longitudinal line copying according to the mark L (FIG. 9) whereby the supporting pins are blocked in the north-south-direction and the other two supporting pins are released, then the operation just described is repeated in the direction of the longitudinal line, in which case the operation is the same as explained with reference to FIGURES 13a–c.

In the position III of the insert part 56 (FIG. 8) and when adjusting the ring 43 to the mark U (revolving) the feeler 3' together with the feeler tube 34 can freely oscillate completely, as this has been the case in the construction according to FIGURE 1. The difference solely consists in that the feeler 3' and the bolt 52 are moved oppositely to each other. Otherwise the mode of operation of this device with the plug assembly in the position III corresponds to that of the example according to FIGURE 1. The feeler thus can follow the pattern all around and scan it from all sides. Simultaneously with the revolving copying operation it is possible to utilize the vertical feeler motions for copying in vertical direction.

In the device according to FIGURE 8 the wedging of the feeler in line copying (position I or II) on a nearly vertical wall which is slightly inclined with respect to the direction of feed is avoided in that the deflection of the feeler in its mounting in the feeler tube initiates the vertical feeding movement. However, the same effect may also be achieved with a reduced influence of the feeler length in a modified construction according to FIGS. 11 and 12 which differs from the last described modification as follows:

The feeler 3' is rigidly mounted in the bottom end of the feeler tube 34. The transfer rod 48 which is provided with the two control bolts 50 and 51, is subjected to the action of the spring 49 and supported on one arm of each of four cranked levers 67 which are arranged in the form of a cross and mounted each in a recess of the feeler tube 34 so as to be tiltable about the pivot 68. The other arm of each lever 67 engages the inwardly directed end of a pivot pin 40, the outer ends of the pins 40 bearing against sliding pieces 42 radially movable in bores of the ring 41 and abutting against the adjusting ring 43. Also in this case the adjusting ring 43 is provided with recesses 44 so that in the positions of the ring 43 marked by Vk, Q, L and U, respectively, the copying operation will be effected in the vertical direction, along cross-lines, longitudinal lines, or in revolving direction, according to the mobility of the feeler. As particularly well shown in FIGURES 14 and 16, when in line copying operation the feeler arrives at an inclined wall, the lateral feeler deflection is transmitted by one of the levers 67 to the transfer rod 48 and causes an upward movement of the rod 48 which in turn influences the control piston 64 for vertical movement and at the same time also the pre-control in the same manner as when the feeler encounters a vertical contour projection protruding into the line. Thereupon the pressure exerting roll 60 of the pre-control unit, which roll until this instant had assumed a position substantially as shown in FIGURE 13a, is moved to the position shown in FIGURE 15, in which case the pre-control unit assists and accelerates the upward movement of the feeler, already initiated by the vertical control piston 64. As soon as the feeler has been raised beyond the inclined wall, the transfer rod 48 is downwardly urged by the spring 49, whereupon the pressure roll 60 returns to its previously assumed position or to a position corresponding to the copied profile of the pattern.

In all modifications of the feeler device which has been fully explained above with respect to its mode of operation, the pre-control member is guided to follow the traced contour when the direction changes and is brought into the neutral position. This means that the pre-control unit remains in inoperative condition for a rectilinear pattern contour. The tracing guidance is effected in smooth and continuous manner when a hydraulic pre-control unit is used. In the electric construction the tracing guidance is brought about by steps, but the switching sensitivity, i.e. the graduation, can be adjusted in this case to any desired degree of fineness even when commercially available precision switches having high quality contacts are employed. The pre-control unit remains in inoperative position with a rectilinear pattern form and the tracing guidance is effected from time to time, at a greater or smaller deviation of the contour of the pattern, dependent on the adjusted switching sensitivity.

With all modifications of the device any desired die shapes or depressions can be traced by the line method, the pre-control being influenced also by obstacles the feeler meets in the direction of line switching. It thus is impossible that the feeler is pushed away by an obstacle when starting a movement on the pattern in line switching direction.

The device according to the invention is generally characterised by the presence of little feeler pressure, and the necessary addition for the diameter of the feeler is also a minimum.

Instead of using only one pre-control member, a plurality of such members could also be employed, which members would then be staggered relatively to each other for example through 90° and alternately connected to the driving motor of the pre-control unit, whereby the revolving direction of the feeler device is reversed.

The change-over switch, moreover, can be formed so that a driving pulse is imparted to the motor in the direction of the new position of rest after the previous supply conduit connection has been shut off and before the conduit connection corresponding to the new direction of rotation has been established, so that the rotary head with the pre-control piston leaves the inoperative or neutral position and the advance control is set in operation.

We claim:

1. A tracer assembly for a copying machine tool having a pattern, said assembly comprising a pivotally suspended feeler adapted to coact with the pattern and being movable in all directions, feed control members coupled to said feeler and moved thereby, an abutment ring surrounding the feeler to limit the pivotal movements thereof, and a pre-control unit comprising a rotary head mounted for rotation about the axis of said abutment ring, a pre-control member carried by said rotary head and engageable with said feeler to exert a pre-control force on said feeler in a direction at a constant angle to the direction of the tangent at the point of contact between the feeler and the pattern, and adjusting means coupled to said rotary head for automatically adjusting the rotational position of said rotary head to keep the angle constant from a position of rest in one or the other direction in response to movements of said pre-control member in opposite directions caused by the pivotal movements of the feeler following the pattern.

2. A tracer assembly as claimed in claim 1 in which said adjusting means for said rotary head is a motor having a supply line for supplying energy to run the motor, and said pre-control unit further comprises a supply line control member in the supply line and a disconnecting and reversing switch in the supply line, and pre-control pressure means, said supply line control member being between said pre-control pressure means and said pre-control member for transmitting the pre-control force to said pre-control member, whereby movement of said pre-control member against the pre-control force under the effect of movement of the feeler moves the supply line control member for controlling the supply of energy to the motor so as to cause the motor to rotate the rotary head one way or the other depending on the direction of movement of said feeler.

3. A tracer assembly as claimed in claim 2 in which said motor is a hydraulic motor and said supply line is a hydraulic line, and said supply line control member is a valve member in said supply line.

4. A tracer assembly as claimed in claim 2 in which said motor is an electric motor and said supply line is an electric line, and said supply line control member comprises a lever pivoted on said rotary head and having said pre-control member thereon, said pre-control pressure means being a spring bearing on said lever, and a switch in said electric line actuated by said lever when said lever is pivoted in response to movement of said feeler and said pre-control member.

5. A tracer assembly as claimed in claim 2 in which a diaphragm is mounted on said tracer assembly and said feeler is mounted on said diaphragm for movement in all lateral directions and up and down movement, the end of said feeler tube remote from the end engageable with the pattern having thereon two pre-control bolts extending radially of the axis of the feeler and at right angles to each other and a third pre-control bolt extending axially of the feeler so as to be at right angles to each of the other two pre-control bolts, said rotary head being mountable on said tracer assembly at one of three positions, said three positions being adjacent the three control bolts respectively and said pre-control member being pivotally mounted on said rotary head for movement in a plane containing the axis of the respective pre-control bolt in the position in which the rotary head is positioned, said rotary head having a recess in which said abutment ring is positioned and the respective bolt extending into the abutment ring, said rotary head having a crown gear thereon, and said motor having a crown gear thereon and being mounted on said tracer assembly in a position in which the crown gear thereon engages the crown gear on the rotary head in all three positions of the rotary head on the tracer assembly.

6. A tracer assembly as claimed in claim 5 and further comprising means for blocking movement of said feeler in planes containing the axis of said feeler and the axes of said radially extending pre-control bolts, said blocking means comprising two radial coaxial thrust pins on diametrally opposite sides of said feeler in each of the planes in which motion is to be blocked, the ends of said thrust pins towards said tube being in pivotal engagement with said feeler, said tracer assembly having a feeler housing around said feeler, said housing having radial bores therein aligned with said thrust pins and having radially slidable sliding members in said radial bores, said thrust pins being pivotally engaged with said sliding members at the ends remote from said feeler, and an adjusting ring rotatably mounted around said housing level with said radial bores, the inner surface of said ring having cam surfaces thereon for engaging said sliding members for blocking them against movement or freeing them for movement.

7. A tracer assembly as claimed in claim 6 in which said feeler comprises a feeler member adapted to engage a pattern, a hollow feeler tube within the lower end of which said feeler is positioned so as to be pivotable in all directions within the bottom of said hollow feeler tube, said blocking means being on said feeler tube, a feeler movement transmittal rod slidable within said feeler tube above said feeler member, spring means in said feeler tube spring loading said transmittal rod toward said feeler member, and movement transfer means between said feeler member and said transmittal rod for transferring lateral movement of said feeler member to said transmittal rod as axial sliding movement of said transmittal rod against said spring means.

8. A tracer assembly as claimed in claim 7 in which said radially extending pre-control bolts are mounted on said transmittal rod.

9. A tracer assembly as claimed in claim 6 in which said feeler comprises a feeler member adapted to engage a pattern, a hollow feeler tube within the lower end of which said feeler is fixed, said blocking means being on said feeler tube, a feeler movement transmittal rod slidable within said feeler tube above said feeler member, spring means in said feeler tube spring loading said transmittal rod toward said feeler member, and movement transfer means between said feeler member and tube and said transmittal rod for transferring lateral movement of said feeler member to said transmittal rod as axial sliding movement of said transmittal rod against said spring means, said movement transfer means comprising two pairs of diametrally opposed crank arms pivotally mounted in the lower end of said feeler tube and each having one arm opposed to one of said thrust pins and having the other end against the lower end of said transmittal rod, whereby movement of the feeler tube toward one of the blocked thrust pins pivots the lever in engagement with said thrust pin and raises said transmittal rod.

References Cited in the file of this patent
UNITED STATES PATENTS 2,562,284   Tancred _____ July 31, 1951